United States Patent
Yamakado et al.

(10) Patent No.: US 6,427,528 B1
(45) Date of Patent: Aug. 6, 2002

(54) APPARATUS FOR THE METHOD OF TESTING VEHICLE

(75) Inventors: Makoto Yamakado, Tsuchiura; Toshihiko Horiuchi, Ushiku; Takao Konno, Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/019,117

(22) Filed: Feb. 5, 1998

(30) Foreign Application Priority Data

Feb. 5, 1997 (JP) .............................................. 9-022369

(51) Int. Cl.[7] ................................................ G01L 5/28
(52) U.S. Cl. ......................................................... 73/121
(58) Field of Search ............................... 73/118.1, 147, 73/865.6, 121–124

(56) References Cited

U.S. PATENT DOCUMENTS

| | | | |
|---|---|---|---|
| 3,952,589 A | * 4/1976 | Geul | 73/117 |
| 4,307,604 A | * 12/1981 | Domitter | 73/121 |
| 4,831,868 A | * 5/1989 | Makino | 73/118.1 |
| 5,148,703 A | * 9/1992 | Vaughan et al. | 73/123 |
| 5,241,854 A | * 9/1993 | Kaizu et al. | 73/117 |
| 5,488,859 A | * 2/1996 | Britt | 73/121 |
| 5,942,678 A | 8/1999 | Wettstein | |
| 6,044,696 A | * 4/2000 | Spencer-Smith | 73/117 |

FOREIGN PATENT DOCUMENTS

| | | |
|---|---|---|
| JP | 1178844 | 7/1989 |
| JP | 6249753 | 9/1994 |

OTHER PUBLICATIONS

Automotive Technology (1996, vol. 50 in Jul., pp. 74–79) "Vehicle High Speed Apparatus in Four Wheel Dynamo Chassis" by Ohashi, et al.
Automotive Technoloy (1975, vol. 29 in Oct., pp. 978–984).

* cited by examiner

Primary Examiner—Benjamin R. Fuller
Assistant Examiner—Jewel V. Thompson
(74) Attorney, Agent, or Firm—Antonelli, Terry, Stout & Kraus, LLP

(57) ABSTRACT

Provided is a vehicle testing apparatus which involves load variation and alignment variation, for analyzing a maneuverability of a vehicle on flat belts or rollers adapted to be rotated together with wheels of the vehicle, and in particular, maneuver variation. Load variation caused by an inertia force and a gravitational force which are produced during actual running of the vehicle, and tire alignment variation caused by suspension strokes, are forcibly reproduced by forces produced by actuators or a gravitational force, thereby it is possible to evaluate a maneuverability of the vehicle in a condition substantially the same as that during actual running of the vehicle.

20 Claims, 12 Drawing Sheets

APPARATUS FOR THE METHOD OF TESTING VEHICLE

BACKGROUND OF THE INVENTION

The present invention relates to an apparatus for and a method of testing the maneuverability of a vehicle on a test bench.

RELATED ART

A flat belt type chassis dynamo is now proposed in order to evaluate the maneuvering stability of the vehicle, substituting for a conventional drum type chassis dynamo. For example, Japanese Patent Unexamined Publication No. 6-249753 discloses a method in which support parts are provided on the upper surfaces of movable parts which can be swung by first hydraulic jacks actuated independent from one another, and can be swung widthwise of the vehicle by second hydraulic jacks actuated independent from one another, corresponding to wheels of a vehicle, and flat belts making contact with the wheels of the vehicle are provided respectively to the support parts, the movable parts being inclined so as to reproduce a climbing slope and a ramp and the support parts being inclined so as to variously change ground contact conditions of the wheels of the vehicle so as to reproduce various disturbances given from the road surface, thereby precisely testing the maneuverability of the vehicle in various road surface conditions over a wide range.

During actual running of a vehicle, dynamic load variation occurs at each of wheels of a vehicle during acceleration or turning, in addition to static load variation caused by a climbing slop or a ramp as mentioned above. For example, during acceleration, loads at rear wheels become larger while during deceleration, loads at front wheels become larger, and during turning, loads at outer wheels become larger. These occur irrespective of a load configuration such as a flat road or a ramp. During acceleration, an inertia force is exerted to the gravitational center of the vehicle while a drive force is exerted to the ground contact points of tires, and accordingly, moments are generated around the pitching axis. Load displacements from the front wheels to the rear wheels occur, corresponding to forces balancing the above-mentioned pitching moments. Similarly, a centrifugal force is exerted to the gravitational center of the vehicle during turning while a cornering force is exerted to a ground contract point, and a rolling moment is effected. A displacement of a load from an outer wheel to an inner wheel occurs, corresponding to a force balancing with the rolling moment.

Further, the wheels (tires) stroke vertically while they are guided by suspension links. Since the links have a limited length, the alignment with respect to the road surface is always changed as the wheels stroke.

The variation in load and variation in the alignment for tires intricately influence upon each other so as to excessively affect the friction forces between the tires and the road surfaces, and cause influence factors which are not negligible for analyzing the maneuverability of the vehicle, in particular abrupt change in maneuvering.

For example, in such a case that a vehicle is arrested in the longitudinal direction thereof on a four wheel flat belt type chassis dynamo, no longitudinal displacement of the vehicle does not occur on the test bench. That is, the longitudinal maneuver is restrained. Accordingly, no moment caused by an inertia force and causing the load variation and the alignment variation is produced. A traction force exerted between each tier and the associated flat belt is exerted to the vehicle arresting device, and accordingly, a reaction force thereto is exerted to the vehicle so that a pitching moment caused by the traction force and the reaction force transmitted from the is finally exerted to the vehicle. If the vehicle arresting device arrests the vehicle at the height of the gravitational center of the vehicle, a pitching moment equal to that during running can be exerted thereto, but if the vehicle arresting device arrests the vehicle at a height lower than the height of the gravitational center, the pitching moment becomes smaller. Thus, the load variation become smaller than that during running.

SUMMARY OF THE INVENTION

The present invention is devised in view of the above-mentioned load variation and alignment variation, and accordingly, one object of the present invention is to provide a testing apparatus for and a testing method which can precisely analyze a maneuverability of a vehicle, and in particular a variation in maneuver of the vehicle.

In a method for carrying out load variation and alignment variation on a test bench, it is required to exert forces representing an inertia force upon acceleration or deceleration and a centrifugal force upon turning, during actual running, to a vehicle, and to adjust these forces in accordance with a load variation and an alignment variation caused thereby.

To the end, according to the present invention, there is provided a vehicle testing apparatus for testing a vehicle on a test bench incorporating dummy road surface means instead for a road surface, comprising means for measuring a relative force between the test bench and the vehicle, and an actuator adapted to be driven in accordance with a force measured by the force measuring means,, for applying a force to the vehicle.

Further, according to the present invention, there is provided a vehicle testing apparatus for testing a vehicle on a test bench incorporating dummy road surface means instead of a road surface, comprising means for measuring a relative force between the test bench and the vehicle, and an actuator adapted to be driven in accordance with a force measured by the force measuring means, for applying a force to the vehicle, wherein the dummy road surface means is driven in accordance with the force measured by the force measuring means.

In the above-mentioned vehicle testing apparatus, the actuator is preferably driven so as to produce a moment around a crosswise (widthwise) axis in accordance with a component longitudinal of the vehicle, measured by the force measuring means.

Further, in the above-mentioned vehicle testing apparatus, the actuator is preferably driven so as to produce a moment around the crosswise (widthwise) axis of the vehicle in accordance with a force exerted to the gravitational center of the vehicle in the longitudinal direction of the latter, a height of the gravitational center of the vehicle, a wheel base of the vehicle.

Further, in the above-mentioned vehicle testing apparatus, the dummy road surface means is driven by the actuator so as to apply a force to the vehicle.

Further, according to the present invention, there is provided a vehicle testing method in which a vehicle is tested on a bench incorporating dummy road surface means used instead of a road surface, comprising the steps of detecting a relative force between the test bench and the vehicle, applying a force to the vehicle by means of an actuator in accordance with the detected force.

Further, according to the present invention, there is provided a vehicle testing method in which a vehicle is tested on a bench incorporating dummy road surface means used instead of a road surface, comprising the steps of detecting a relative force between the test bench and the vehicle, applying a force to the vehicle by means of an actuator in accordance with the detected force, and driving the road surface means in accordance with a relative force between the test bench and the vehicle.

In the above-mentioned vehicle testing method, a force component longitudinal of the vehicle is preferably measured, a moment around a crosswise axis of the vehicle is calculated from the force component, and the actuator is driven so as to produce this moment.

Further, in the above-mentioned vehicle testing method, a force longitudinal of the vehicle, exerted to the gravitational center of the vehicle, is preferably measured, a moment around a crosswise axis of the vehicle is calculated from the force, a height of the gravitational center and a wheel base of the vehicle, and the actuator is driven so as to produce this moment.

Further, in the above-mentioned vehicle testing method, a the dummy road surface means is driven by the actuator so as to exert a force the vehicle.

According to the present invention, since a force is applied to the vehicle, in accordance with a relative force between the test bench and the vehicle, measured by the force measuring means, load variation of the vehicle, and alignment variation of tires caused by suspension stroke can be effected during testing.

DESCRIPTION OF THE PREFERRED EMBODIMENTS OF THE INVENTION

Figures 1A, 1B, 1C:
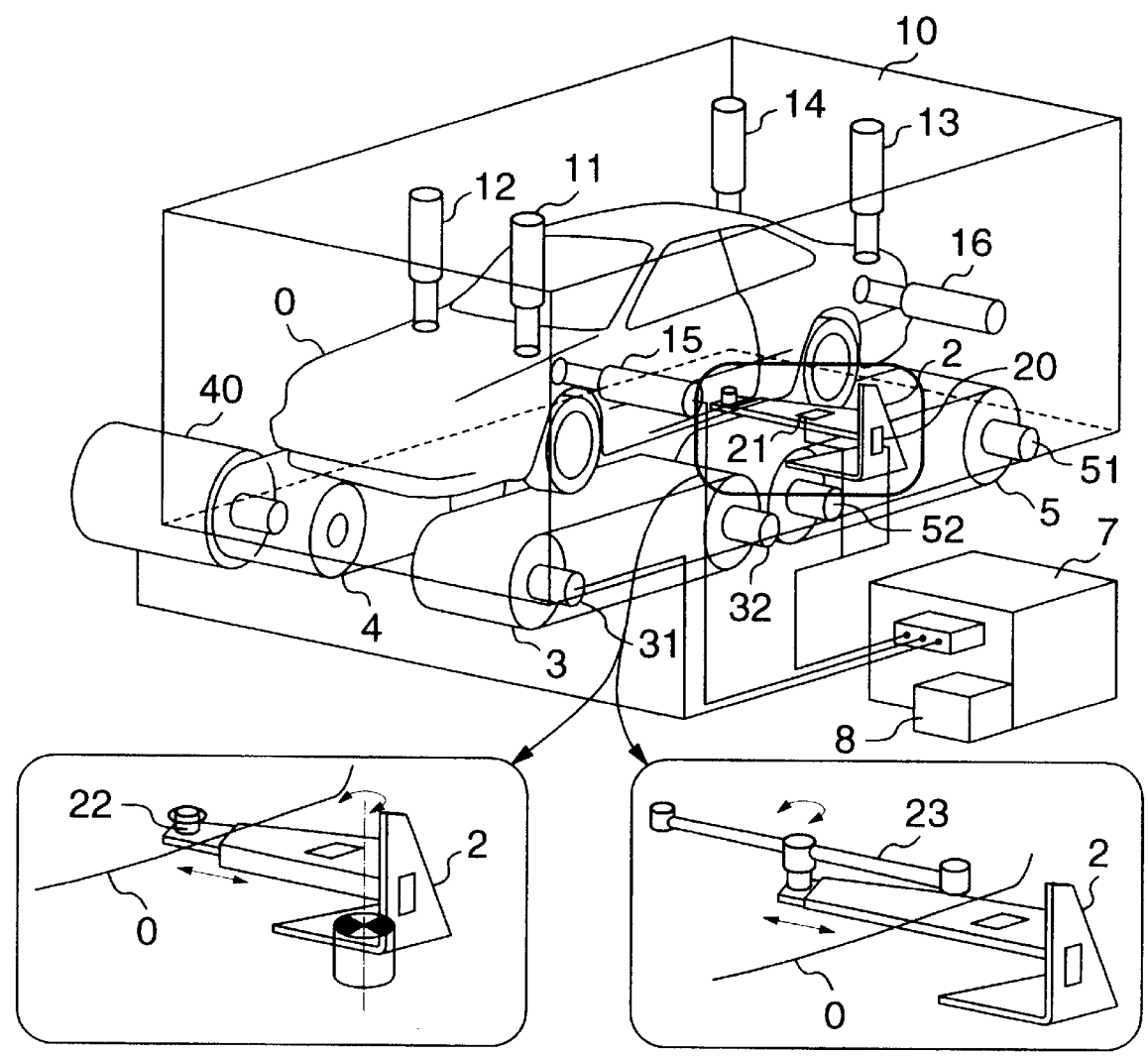
FIGS. 1a to 1c are schematic views illustrating an overall arrangement of a first embodiment of the present invention.

Explanation will be hereinbelow made of embodiments of the present invention with reference to FIGS. 1 to 15.

Referring at first FIG. 1a, a first embodiment of the present invention will be explained.

A vehicle O is carried on a front left wheel flat belt 3, a front right wheel flat belt 4, a rear left wheel flat belt 5 and a rear right wheel flat belt 6 which serve as dummy load surface means used for a road surface. These flat belts are driven and braked by motor generators (only a motor generator 40 for the front right flat belt 4 is shown) for power generation for absorption. Further, although not shown, the flat belts may be carried on a test bench, or arranged on a base or a floor serving as a reference plane. In such a case that the flat belts are arranged on a base or a floor, these are preferably embedded therein.

The vehicle O is fixed to the frame 10 so as to arrest only a motion longitudinal of the vehicle by means of securing (arresting) members 2. That is, motions in the crosswise and vertical direction of the vehicle, pitching and rolling, and yawing can be produced with no restriction. Accordingly, the fixing (restraining) members 2 are secured to the base or the test bench. FIGS. 1a and 1b are detailed views illustrating an example of these fixing means.

For example, Automotive Technology (1996, Vol. 50 in July, pages 74 to 79) "Vehicle High Speed Apparatus in Four Wheel Dynamo Chassis" written by Ohashi and others discloses a method of fixing a vehicle by insertion pins with the use of toque box holes formed in a monocock body thereof so as to obtain the fixing means for the vehicle on the testing apparatus. Alternatively, Automotive Technology (1975, Vol. 29 in October, Pages 978 to 984) discloses a vehicle arresting method in which a vehicle is not moved in the longitudinal direction of the vehicle in an Odie's Chassis Dynamo Chassis device, but can be moved in the other directions with sufficient freedom.

FIG. 1a discloses a method of using a torque box and an insertion pin 22 which are displaceable crosswise of the vehicle, and the fixing member 2 us rotatable relative to the base or the test bench having a structure allowing the vehicle to displace in the yawing direction of the vehicle. With this arrangement, the fixing member 2 which is not shown in the figure, a fixing member similar to the fixing member 2 is also required on the opposite side of the vehicle.

FIG. 1b shows a method in which left and right torque box holes are connected to each other by means of a rod-like member 23, and the center point thereof is supported. The rod-like member and the fixing member 2 are formed of spherical joints or the like which cannot restrain the rotational motion of the vehicle. With this arrangement, the fixing member 2 is required only on one side, but this arrangement requires a high degree of stiffness in comparison with the arrangement shown in FIG. 1a.

Actuators 11, 12, 13, 14, 15, 16 are fixed at their one end to the frame 10, for applying forces to the vehicle 10 in accordance with actuator drive signals computed by a computing means 7, so as to allow the vehicle O to take an optional posture. Joints which allow the vehicle to be restrained only in directions in which forces are applied to the vehicle, are used respectively in joint parts between the actuators, the vehicle O and the frame 10. Japanese Patent Unexamined Publication No. 1-178844 discloses such joints.

The motion of the vehicle O which is driven by a driver or a controller in accordance with a test mode, is arrested in the longitudinal direction of the vehicle by the arresting member 2 so that it cannot not be moved forward, and accordingly, a power generated by the vehicle O is consumed as a power for driving the flat belts. A change in the posture of the vehicle O can be effected by the actuators 11, 12, 13, 14, 15, 16, and the change in the posture and the absolute posture of the vehicle O can be measured by displacement detectors (which is not shown) provided to the actuators. Thus, dynamic characteristics such as a control ability, a stability, and a compliance characteristic in transient suspension can be measured on this test bench (measuring equipment is not shown).

The arresting member 2 is provided thereto with a force measuring means for measuring a relative force effected between the base (test bench) and the vehicle. This force measuring means is composed of a strain gage type load cell or the like, comprising a longitudinal reaction force measuring means 20 for measuring a force in the vehicle longitudinal direction, among forces exerted to the arresting member 2 from the vehicle, and a crosswise reaction force measuring means 21 for measuring a force in the vehicle crosswise direction. Due to the provision of an arresting method which allows yawing motion and the like of the vehicle O, even though a deviation is caused between the reaction force measuring means in the longitudinal and crosswise directions of the actual vehicle, a posture of the vehicle O can be detected by the displacement detectors incorporated to the actuators, and accordingly, a force in the vehicle longitudinal direction and a force in the vehicle crosswise direction can be measured with a high degree of accuracy by compensating the forces with the use of detected values by the displacement detectors with the use of a computer 7 serving as the computing means. Drive signals for the motor generators for driving the flat belts, are computed by the computing means 7. Further, there may be used drive signals stored in a drive signal storage means 8 in accordance with an existing test mode. In such a case that the vehicle is of a two wheel drive type such as a front drive type or a rear wheel drive type, the flat belts on the driven wheel sides may be driven in accordance with rotating data on the drive wheel side.

Each of the flat belts is provided thereto with an axial force detecting means as one of the force measuring means for measuring a relative force between the base (test bench) and the vehicle, for measuring a force in a direction of the shaft of two rollers between which the belt is stretched. This axial force detecting means can be constituted with the use of a load cell.

Figure 2:
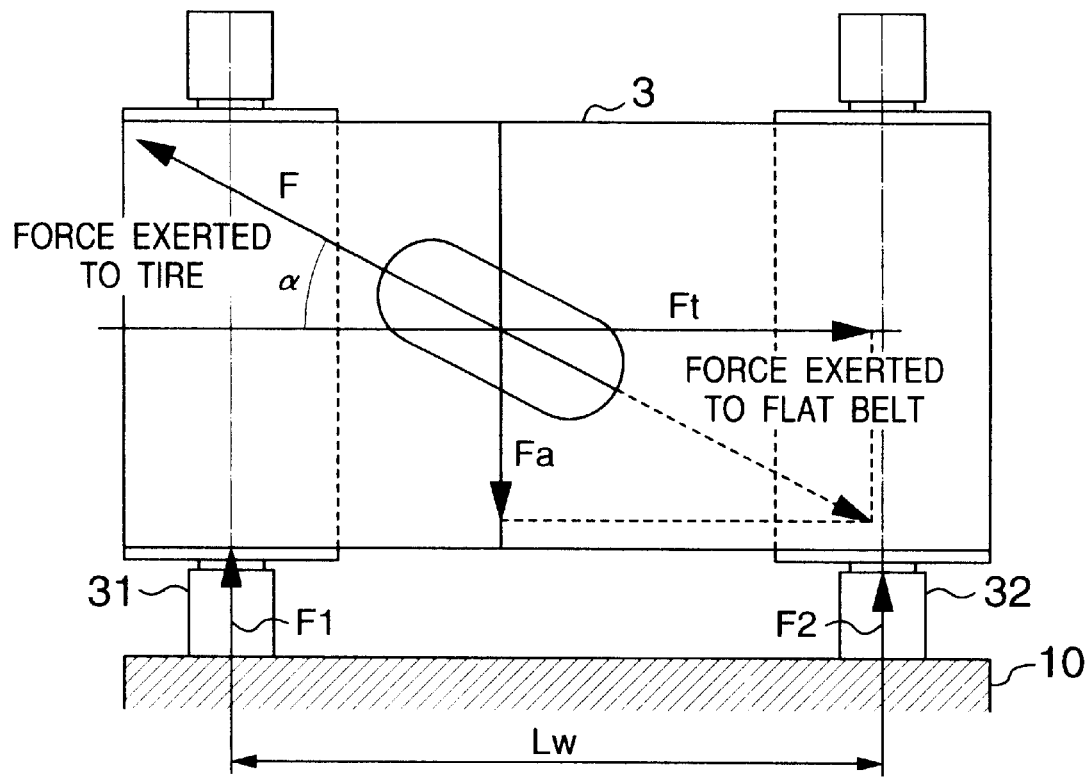
FIG. 2 is a schematic view showing a technique for measuring a force exerted to a flat belt from a vehicle.

FIG. 2 is a view for explaining measurement of a tire crosswise force and a tire traction force through axial detection as to axial force detecting means 31 32 for the front left wheel flat belt 31. In a condition shown in FIG. 2, the tire rotates having a slip angle α with respect to the advancing direction of the flat belt 3. When the flat belt exerts a force F to the tire, the flat belt 3 receives a reaction force having the through the reaction. This reaction force can be decomposed into an advancing component Ft in the advancing direction of the flat belt 3 and a an axial component Fa.

The force Ft is absorbed by the motor generator for driving the flat belt. If the inertial moment of the entire system of the flat belt is known, The force Ft can be obtained from revolution data such as a rotational speed of the flat belt or an angular acceleration thereof. The axial component Fa is measured by the axial force detecting means 31, 32 fixed between a shaft and the frame 10.

If measured values F1, F2 are detected by the axial force detecting means 31, 32, the axial component Fa is give by the following formula $$Fa = F1 + F2 \quad \text{(Formula 1)}$$

Further, the inter-axial distance is set to Lf, the following formula is obtained:

$$Tm = Lf \times |F1 - F2| \quad \text{(Formula 2).}$$

By using this formula, a moment Tm which is exerted to the flat belt by the tire can be obtained.

Thus, by measuring forces exerted to the flat belt by four wheels, respectively at the four wheels, in various operating conditions, forces and moments inputted to the vehicle through the tires can be measured.

As mentioned above, in the first embodiment of the present invention, a force exerted to the vehicle O from the flat belt, that is, a force produced by the vehicle O, and a force exerted to the fixing member 2 from the vehicle O can be measured.

Naturally, since components of these two forces are balanced unless the vehicle O moves, relative to the fixing point, either one of these two forces may be used, but it is preferable to use two forces so as to compensate the forces with each other. For example, in such a case that the wheel floats up from the belts so as to interrupt the contact therebetween, the force exerted to the fixing member 2 should be measured. However, in such a case that moments exerted to the wheels are measured, the forces exerted to the vehicle O from the flat belts should be measured.

Referring to FIGS. 3, 4, 5, 6, 7, 8 and 9, there will be explained the balance of forces during actual running, the balance of forces on the conventional tester and a technique in the first embodiment of the present invention with which a condition substantially equal to an actual running condition is obtained by using forces exerted to the vehicle O and measured as mentioned above.

Figure 3:
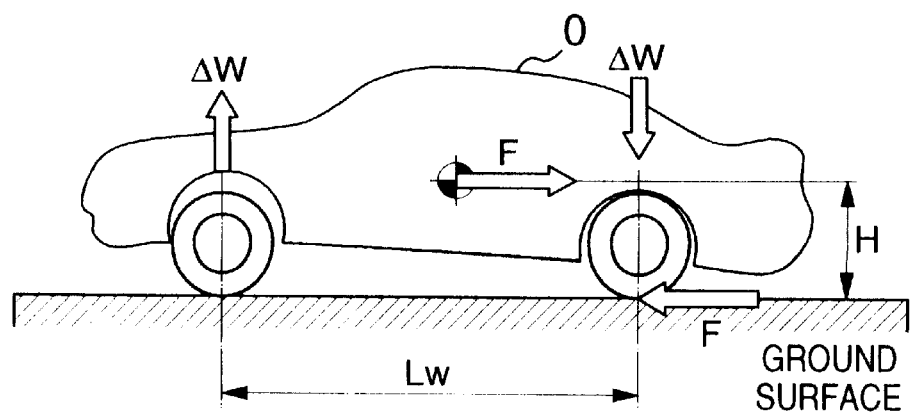
FIG. 3 is a view showing a balance of forces upon acceleration of a vehicle during actual running.

FIG. 3 is a view for explaining a displacement of a load from the front wheel to the rear wheel when the vehicle O rectilinearly accelerates. Now estimating that the vehicle O having a mass M accelerates at an acceleration a, a reaction force F exerted to the tire from the ground surface is given by the following formula:

$$F = M * A \quad \text{(Formula 3)}$$

Further, an inertia force F equal to this reaction force is exerted to the vehicle gravitational center having a height H from the ground surface, and these forces give a pitching moment around the pitching axis of the vehicle O which are given by the following formula:

$$Tp = F*H \qquad \text{(Formula 4)}$$

The displacement of the load from the front wheel to the rear wheel occurs in order to balance the pitching moment.

The degree $\Delta W$ of the displacement of the load is given the following formula which gives a value in total of left sides wheels:

$$\Delta W = F \times (H/Lw) \qquad \text{(Formula 5)}$$

where Lw is the wheel base. A load Wt at the drive wheel is given by the following formula in the case of a front wheel drive type:

$$Wt = Wf - \Delta W \qquad \text{(Formula 6)}$$

but in the case of a rear wheel drive type:

$$Wt = Wr + \Delta W \qquad \text{(Formula 7)}$$

where Wf is a load at the front wheel in a static condition, and Wt is a load at the rear wheel in a static condition.

The drive wheel load Wt closely relates to the frictional force between the tire and the road surface, that is, the traction limit. Further, the rear part of the vehicle body dives due to an inertia force exerted to the vehicle body, and accordingly, alignment variation is caused by a suspension stroke, which also relates to the traction limit. Even though the engine output power is high, a vehicle having a low traction limit cannot accelerate in conformity with the engine output power since the drive force overcomes the traction force of the tire which therefor races. This fact causes the starting and accelerating characteristics of vehicles even having the identical output power and the identical weight to differ from one another.

Figure 4:
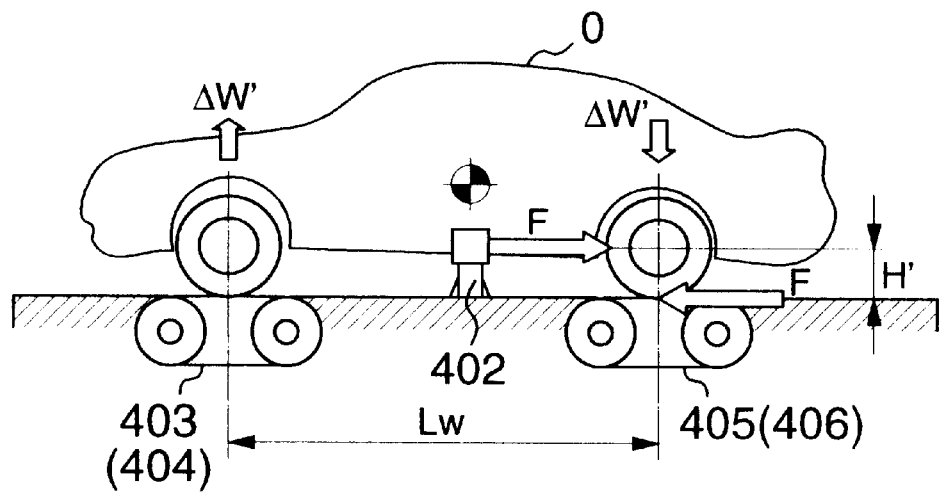
FIG. 4 is a view showing a balance of forces upon acceleration of a vehicle by a tester on a conventional test bench.

Next, referring to FIG. 4, consideration will be made for a balance of force upon acceleration on the conventional tester.

In the conventional tester, such a test that a heavy drive wheel load is exerted so as to restrain a slip between the tire and the tester, and an engine output power is measured with the use of the vehicle has been interested, rather than that dynamic vehicle maneuvering such as a traction limit which is affected by a suspension type or a drive wheel load is tested. Although it is of course possible in this embodiment to carry out the above-mentioned test in which loads are exerted to the drive wheels by the actuators, there will be considered such a case that no such an excessive drive wheel load is exerted.

The vehicle O is accelerated on the flat belt 403 (for front left wheel), 404 (for front right wheel), 405 (for rear left wheel), 406 (for rear right wheel), and receives reaction forces F from the flat belts. However, it does not produce an inertia force since it is fixed by the fixing member. However, a reaction force from the fixing member 2 is exerted to the vehicle O, and accordingly, a balance in the vehicle longitudinal direction can be obtained finally.

The moment around the pitching axis is exhibited by the following formula:

$$Tp' = F*H' \qquad \text{(Formula 8)}$$

where H' is the height of the arresting point of the vehicle O. However, the moment obtained from this formula differs from the moment obtained during actual running.

Further, the load displacement $\Delta W'$ from the front wheel to the rear wheel which is produced to balance the above-mentioned pitching moment is given by the following formula:

$$\Delta W' = F \times (H'/Lw) = \Delta W \times (H'/H) \qquad \text{(Formula 9)}$$

The value obtained from this formula differs from a value obtained during actual running. In the above-mentioned condition, the traction limit cannot be evaluated.

Figure 5:
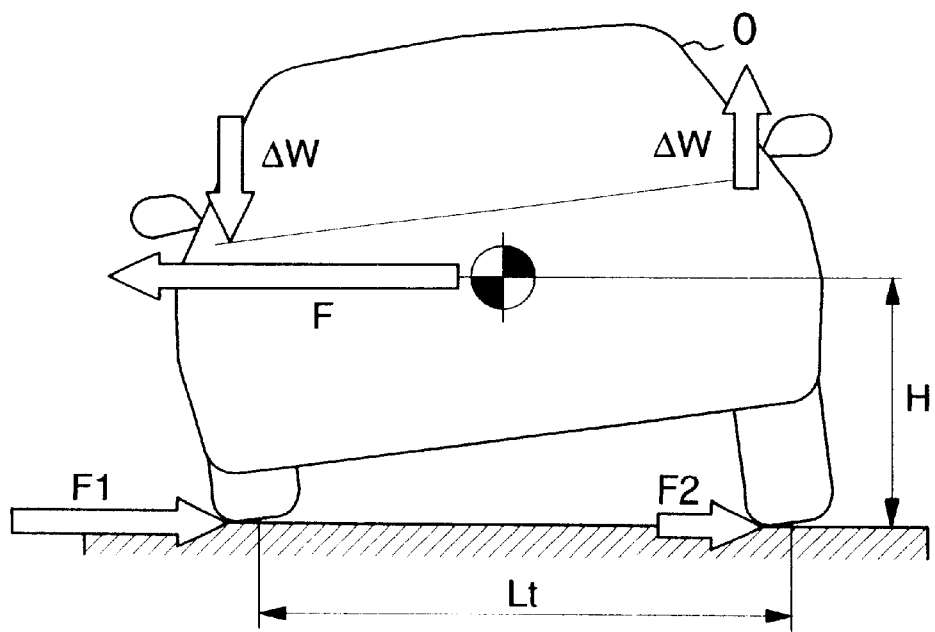
FIG. 5 is a view showing a balance of forces upon turning during actual running.

FIG. 5 is a front projection view which shows a balance of forces upon turning (left turning) of the vehicle, at the position of the gravitational center of the vehicle O. However, in this condition, the distribution of the front and rear weights is set so as 50:50. Since a centrifugal force is exerted to the gravitational point having a height H from the ground surface while a cornering force is exerted to the ground contact point, these forces are given a moment around the rolling axis of the vehicle O, which is exhibited by the following formula:

$$Tr = F*H \qquad \text{(Formula 10)}$$

The load displacement from the left wheel to the right wheel occurs so as to balance this rolling force.

The front and rear treads are equal to each other, and the load displacement $\Delta W$ is exhibited by the following formula:

$$\Delta W = F \times (H/Lt) \qquad \text{(Formula 11)}$$

where Lt is the value of the treads. It is noted here that the load displacement $\Delta W$ exhibits the sum of load displacements of the left and right wheels.

As a result, the load at the left tire of the vehicle is given by the following formula:

$$Wcr = Wr - \Delta W \qquad \text{(Formula 12)}$$

And the load at the right tire of the vehicle is given by the following formula:

$$Wcl = Wl - \Delta W \qquad \text{(Formula 13)}$$

Where Wr is a right wheel load in a static condition, and wl is a left wheel load in a static condition.

The loads of all wheels closely relate to the friction force between the tires and the road surface, that is, the cornering characteristic. Further, rolling is caused by an inertia force exerted to the vehicle body so as to raise alignment variation caused by a suspension stroke. This also closely relates the cornering characteristic.

Next, referring to FIG. 6, consideration will be made of a balance of force upon cornering on the conventional tester with reference to FIG. 6. The vehicle O carries out cornering on the flat belts so as to receive reaction forces F1, F2 from the flat belts, but no centrifugal force F is produced since the vehicle O is fixed by the fixing member. However, a reaction force F is exerted to the vehicle O from the fixing member 2, a cross-wise balance is finally obtained in the vehicle O.

Further, the moment around the rolling axis is exhibited by the following formula:

$$T' = F*H' \qquad \text{(Formula 14)}$$

where H' is the height of the arresting point of the vehicle O by the fixing member 2. The value obtained by this formula differs from that obtained during actual running.

Further, the load displacement ΔW' from the left wheel to the right wheel generated so as to balance this rolling moment is exhibited by the following formula:

$$\Delta W' = F \times (H'/Lt) = \Delta W \times (H'/H) \qquad \text{(Formula 15)}.$$

The value obtained from this formula also differs from that obtained during actual running. In such a condition, actual wheel loads and a degree of rolling of the vehicle cannot be obtained, and accordingly, a cornering characteristic of the vehicle cannot be evaluated.

Figure 7:
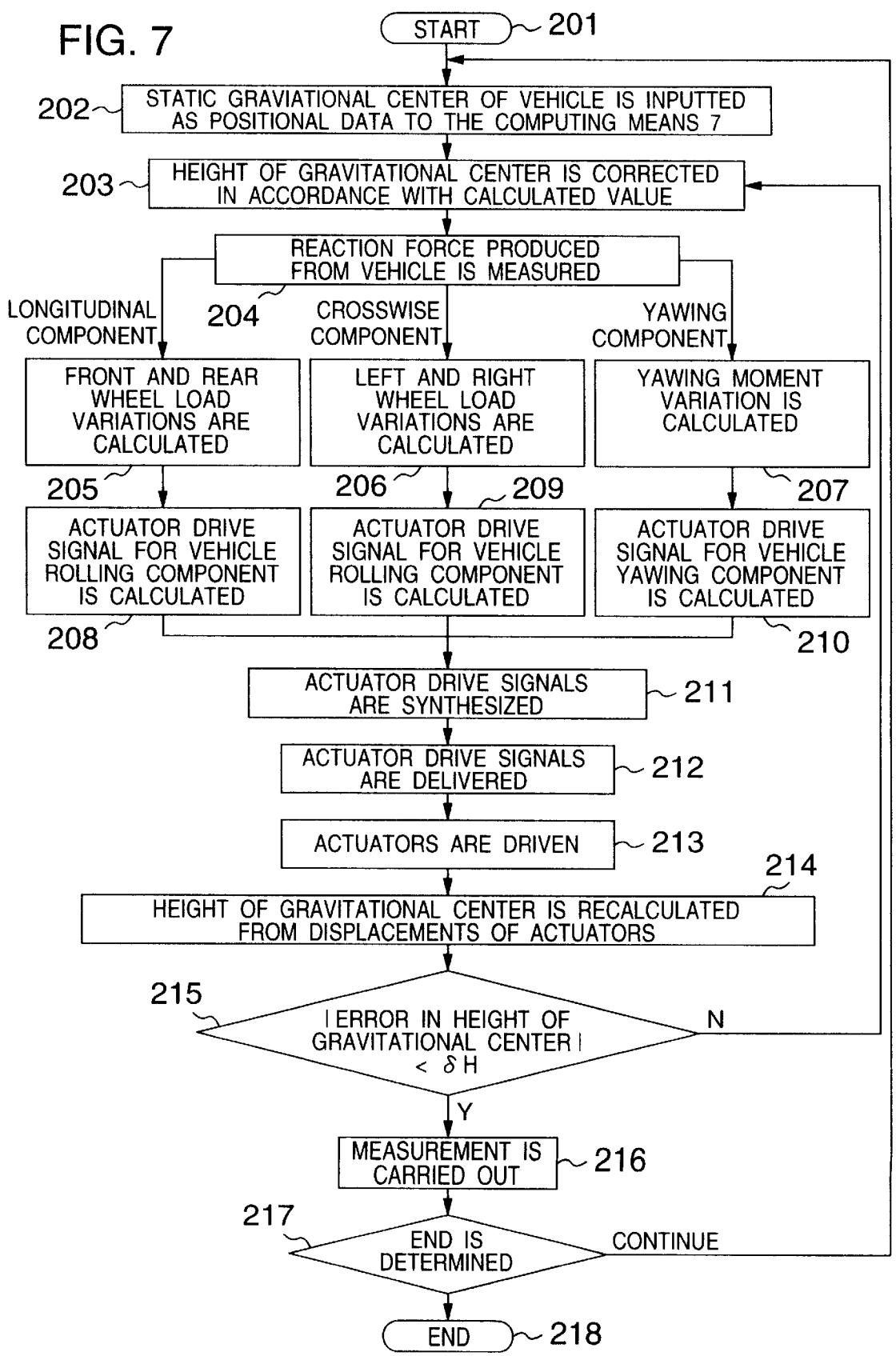
FIG. 7 is a flow chart showing a test procedure for a vehicle maneuver test apparatus in the first embodiment of the present invention.

Next, explanation will be made of a testing method using the vehicle maneuver testing device according to the present invention with reference to FIG. 7.

(1) Start (step 201);
(2) The static gravitational center of the vehicle is inputted as positional data to the computing means 7 (step 202);
(3) The height of the gravitational center is corrected in accordance with a calculated value of the dynamic gravitational center (step 203);
(4) A reaction force produced from the vehicle is measured (step 204); (Component longitudinal of the vehicle)
(5) Front and rear wheel load variations are calculated (step 205);
(6) An actuator drive signal for the vehicle rolling component is calculated (step 208);
(7) Left and right wheel load variations are calculated (step 206);
(8) An actuator drive signal for a vehicle rolling component is calculated (step 209) (Yawing Component of the vehicle)
(9) Yawing moment variation is calculated (step 207);
(10) An actuator drive signal for a vehicle yawing component is calculated (step 210)
(11) The actuator drive signals are synthesized (step 211);
(12) The actuator drive signals are delivered (step 212);
(13) The actuators are driven (step 213);
(14) A posture of the vehicle is calculated from displacements of the actuators detected by the displacement detectors provided to the actuators and the height of the gravitational center is recalculated(step 214);
(15) An error between the original height of the gravitational center and the recalculated height of the gravitational center is compared with a predetermined value δH (step 215);
(16) The maneuvering of the vehicle is measured (step 216);
(17) The end is determined (step 217)
(18) End (step 218)

The determination of the end is made by determining whether a predetermined time has elapsed or not, or whether a rest signal is delivered to the vehicle maneuver testing apparatus or not.

The above-mentioned steps simulate such a case that a load condition is the same as that of a vehicle to be tested on a flat load surface. There may be such cases that an input value of the previous gravitational center is changed in accordance with road surface data such as a ramp or a climbing slope, a number of occupants or a loading weight, and that a preset load is changed in order to change the actuator force.

Next, referring to FIG. 8, the technique for creating an accelerating condition similar to that during actual running in the first embodiment of the present invention will be explained. It is noted that the vehicle O is a rear wheel drive type one in this embodiment, and accordingly, forces exerted to the tires from the flat belts 5, 6 and the force F exerted to the vehicle fixing member 2 can be measured. Actuator signals Wpact are computed by the computer 7 as the computing means with the use of the following formula:

$$\Delta Wpact = \Delta W - \Delta W' = F(H-H')/Lw \qquad \text{(Formula 16)}$$

The actuators are driven in response to the drive signals. Thus, an upward lift-up force having a value ΔWpact is exerted to the vehicle O by the actuators 11, 12 (the actuator 12 is not shown), and a downward depressing force having a value ΔWpact is exerted to the vehicle O by the actuators 13, 14 (the actuator 14 is not shown). As a result, a load displacement from the front wheel to the rear wheel when the vehicle O rectilinearly accelerating can be effected, similar to that shown in FIG. 3. With this arrangement, geometry variation caused by a force for depressing the drive wheels and suspension strokes upon acceleration during actual running can be simulated on the test bench, and accordingly, bench tests including a test for evaluating the traction limit can be carried out in a nearly actual condition.

Considering here such a case that the fixing point of the vehicle is located at the height of the gravitational center in the conventional tester, the load displacement from the front wheel to the rear wheel can be simulated, similar to that upon acceleration during actual running. However, in such a case that the height of the gravitational center dynamically varies due to a loading condition, a load displacement or the like, it cannot cope with, on the contrary, according to the present invention, a posture of the vehicle O can be detected by the displacement detectors incorporated in the actuators, and accordingly, the motion at the gravitational center can be measured, thereby it is possible to always carry out optimum compensation.

Figure 9:
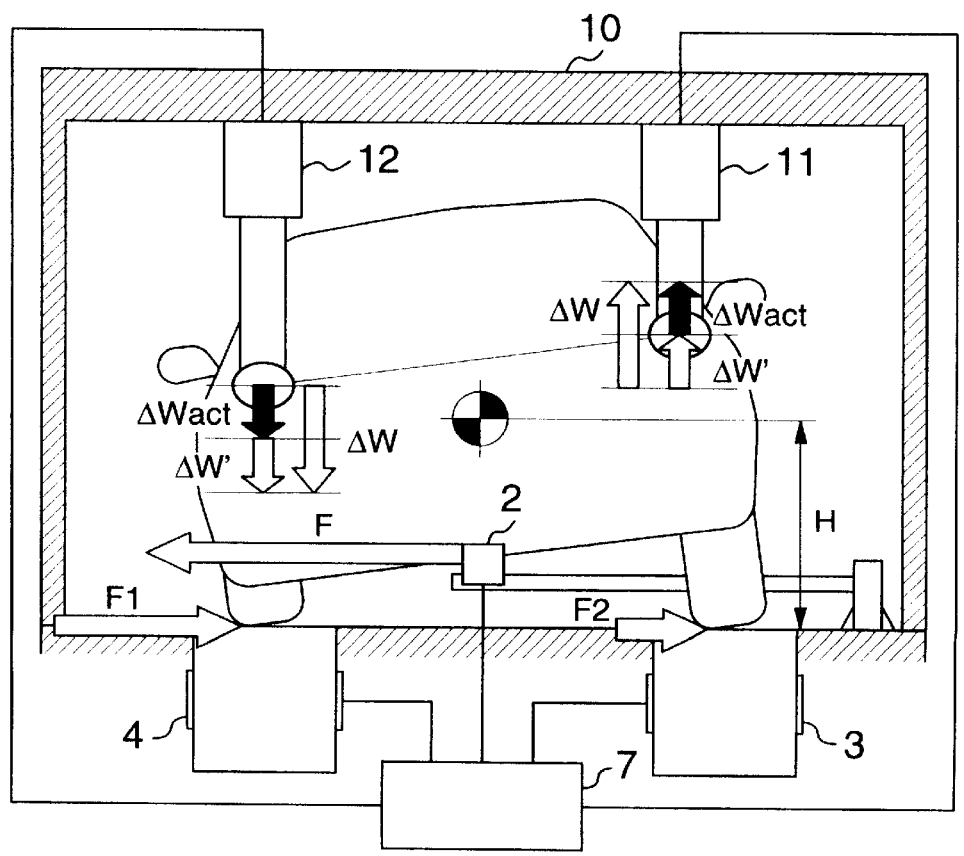
FIG. 9 is a view showing a balance of forces upon turning of a vehicle in a condition in which the vehicle maneuver test apparatus in the first embodiment of the present invention is operated.

Next, referring to FIG. 9, the technique in the first embodiment of the present invention, which can simulate a cornering condition similar to that during actual running will be explained. For the sake of brevity, it is estimated that the distribution of the front and rear weight is set to 50:50. The left and right wheels are considered to be in pairs. With the use of the above-mentioned arrangement, forces exerted to the tires from the flat belts 3, 4, 5, 6 and a force F exerted to the vehicle fixing member 2 can be measured. Actuator drive signals are computed by the computing means 7 with the use of the following formula:

$$\Delta Wract = \Delta W - \Delta W' = F \times (H-H')/Lt \qquad \text{(Formula 17)}$$

The actuators are operated in response to these drive signals. An upward lift-up force having a value ΔWract is applied to the vehicle O by the actuators 11, 13 (the actuator 13 is not shown in this figure), and simultaneously, a downward depressing force having a value ΔWract is exerted to the vehicle O by the actuators 12, 14 (the actuator 14 is not shown in this figure). As a result, a load displacement from the right wheel to the left wheel is effected upon cornering of the vehicle O, similar to that shown in FIG. 6. Accordingly, a geometry change caused by drive wheel depressing forces and suspension strokes upon actual cornering of the vehicle can be simulated on the test bench, and accordingly, bench tests including a test for evaluating a cornering characteristic can be made in a condition nearly equal to an actual running condition.

Figure 6:
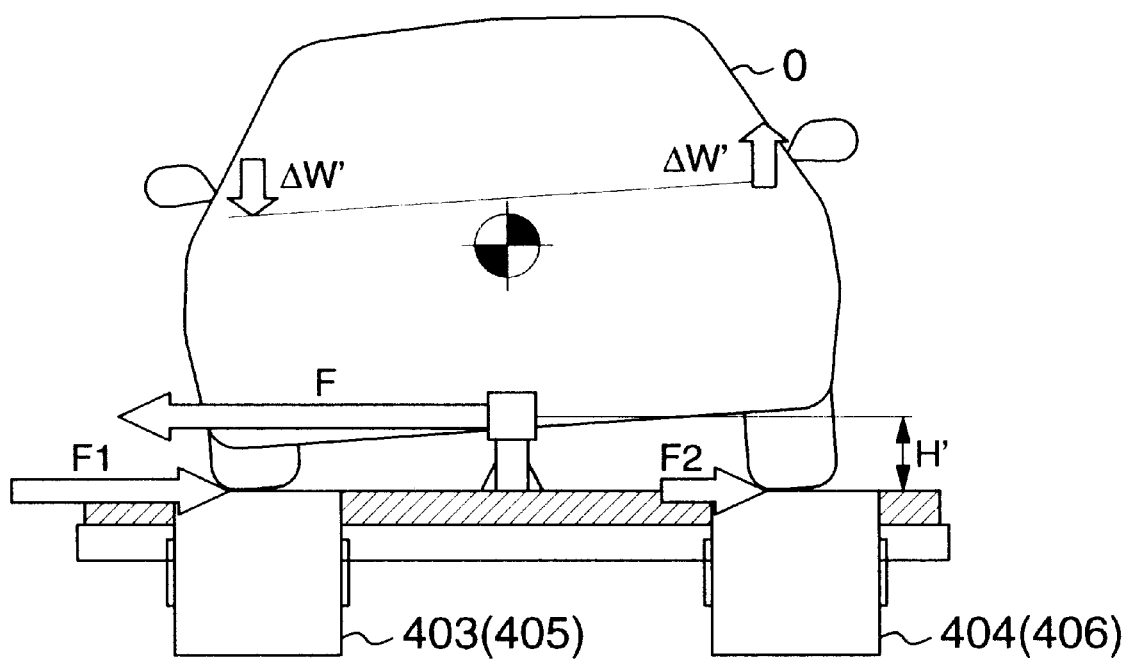
FIG. 6 is a view showing a balance of forces upon turning of a vehicle by a tester on a conventional test bench.

Considering here such a case that the vehicle arresting point is located at the height of the gravitational center in the conventional type tester shown in FIG. 6, the load displacement from the right wheel to the left wheel or from the left wheel to the right wheel upon acceleration during running substantially the same as that of an actual vehicle can be effected. However, in such a case that the height of the gravitational center dynamically varies due to a loading condition, a load displacement or the like, it cannot cope with. On the contrary, according to the present invention, a posture of the vehicle O can be detected by the displacement detectors incorporated to the detectors, a motion at the gravitational center can be calculated, thereby it is possible to carry out optimum compensation.

Figure 10:
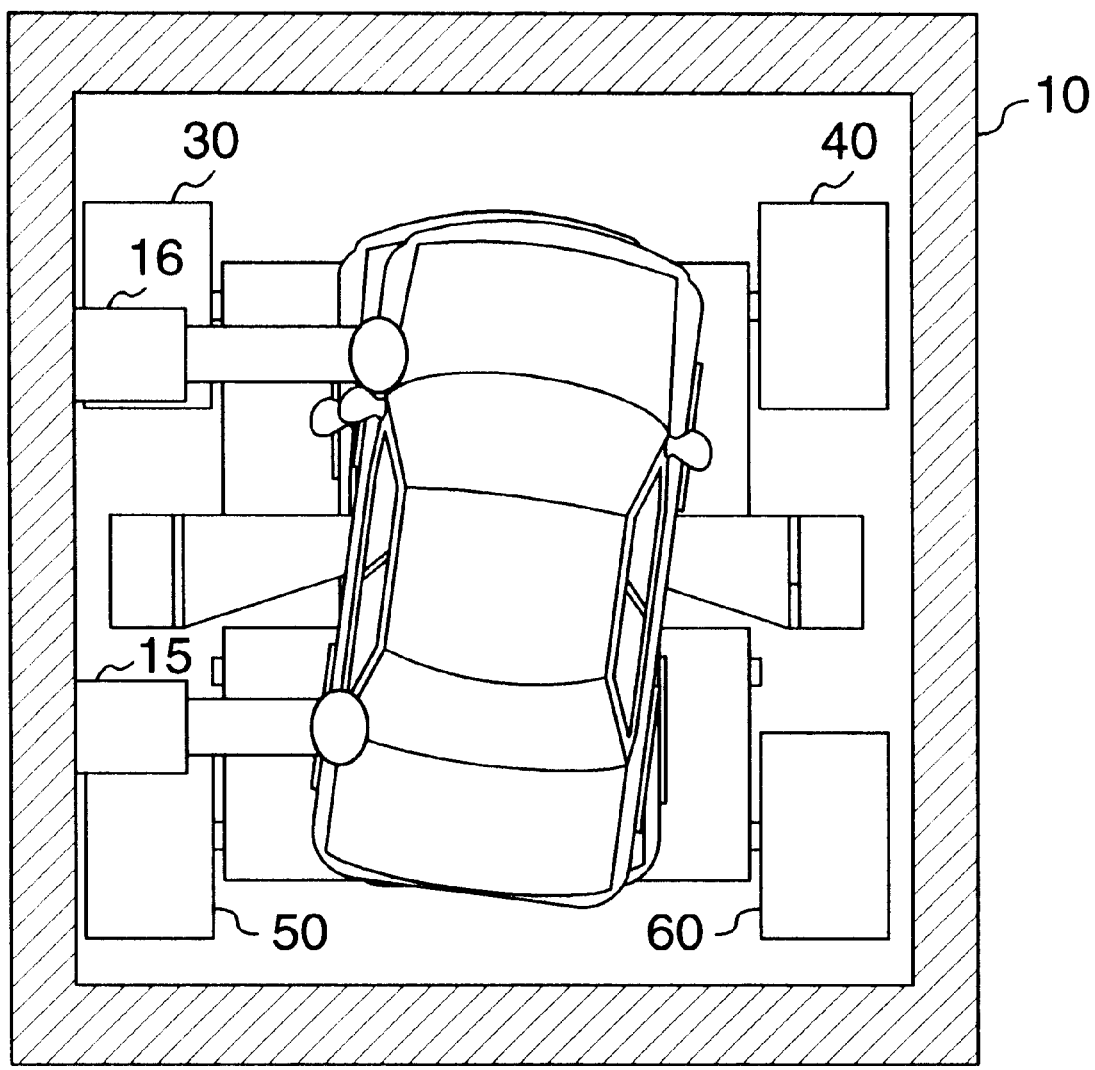
FIG. 10 is a view showing a method for simulating a maneuver having a deviation between a vehicle advancing direction and a direction of a tire upon cornering in the first embodiment of the present invention.

FIG. 10 is a view which shows a simulated motion in a condition in which a deviation is present between the vehicle advancing direction and the direction of the tire upon cornering or a condition in which the tire has a slip angle. According to the present invention, since a friction force between the tire and the flat belt, and a moment can be measured, testing can be made, the positional relationship between the vehicle and the flat belt being set to an optional angle while a balance with yawing moment is held. Further, even though the frictional force between the tire and the flat belt varies moment by moment, the yawing moment and the crosswise balance is computed so as to deliver drive instructions to the actuators in order to balance centripetal force caused by cornering forces of the tires with forces produced by the actuators, and accordingly, it is possible to prevent the vehicle from coming off from the flat belts.

As mentioned above, there has been explained in the first embodiment of the present invention such a method that pitching, rolling and yawing are produced in accordance with a vehicle driving condition and vehicle dimensions including a wheel base and a tread, and load variation and alignment variation which are similar to those during actual running are forcibly simulated with the use of the actuators in order to carry out a bench test in a condition substantially the same as that during actual running. In this embodiment, although the pitching, the rolling and the yawing are produced, independent from one another, it is natural that they can be produced in combination so as to cope with variation in the maneuvering of the vehicle. In such a case, the computing means 7 computes drive signals for the actuators so that the actuators are coordinately operated.

Figure 11:
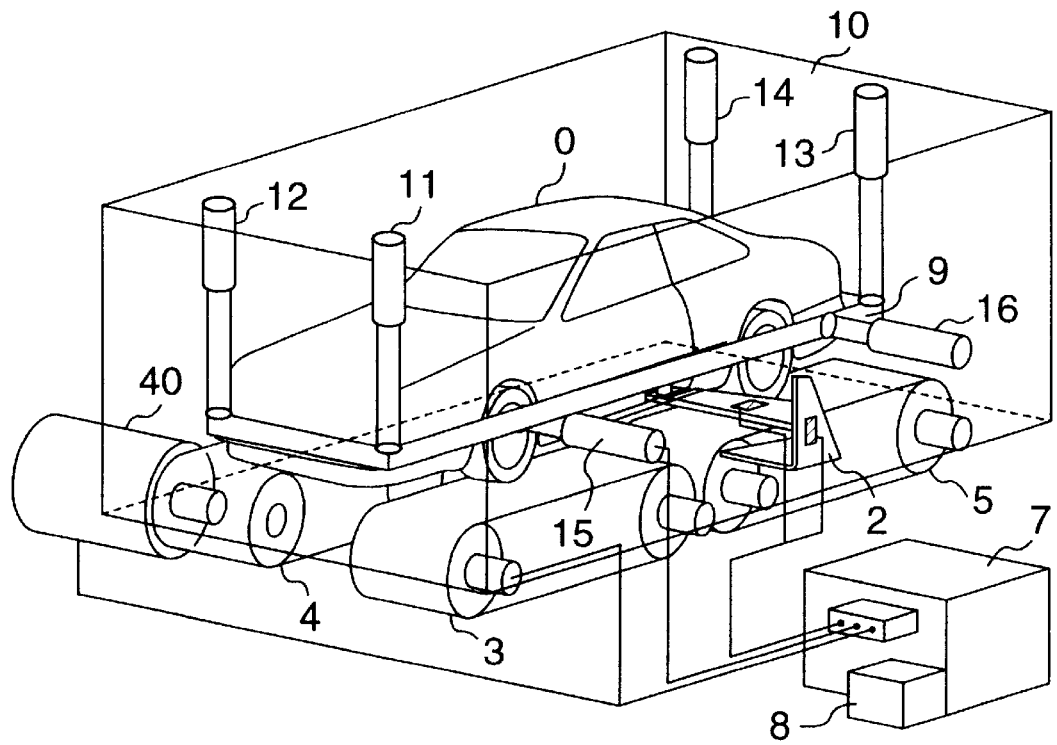
FIG. 11 is a schematic view illustrating an overall arrangement of a second embodiment of the present invention.

Further, although, in this embodiment, the method in which the actuators are directly attached to the vehicle has been explained, a jig 9 may be provided to the vehicle in order to exert forces to the vehicle from the actuators, as will be explained later in a second embodiment of the present invention shown in FIG. 11. With this arrangement, the points at which the actuators exert forces to the vehicle can be changed determined, irrespective of a shape of the vehicle, and accordingly, the drive can be made in a more ideal manner. Further, the freedom with which the actuators are attached to the jig 9 is higher than that of the arrangement in which the actuators are attached directly to the vehicle, thereby it is possible to reduce interference among the forces of the actuators.

Figure 12:
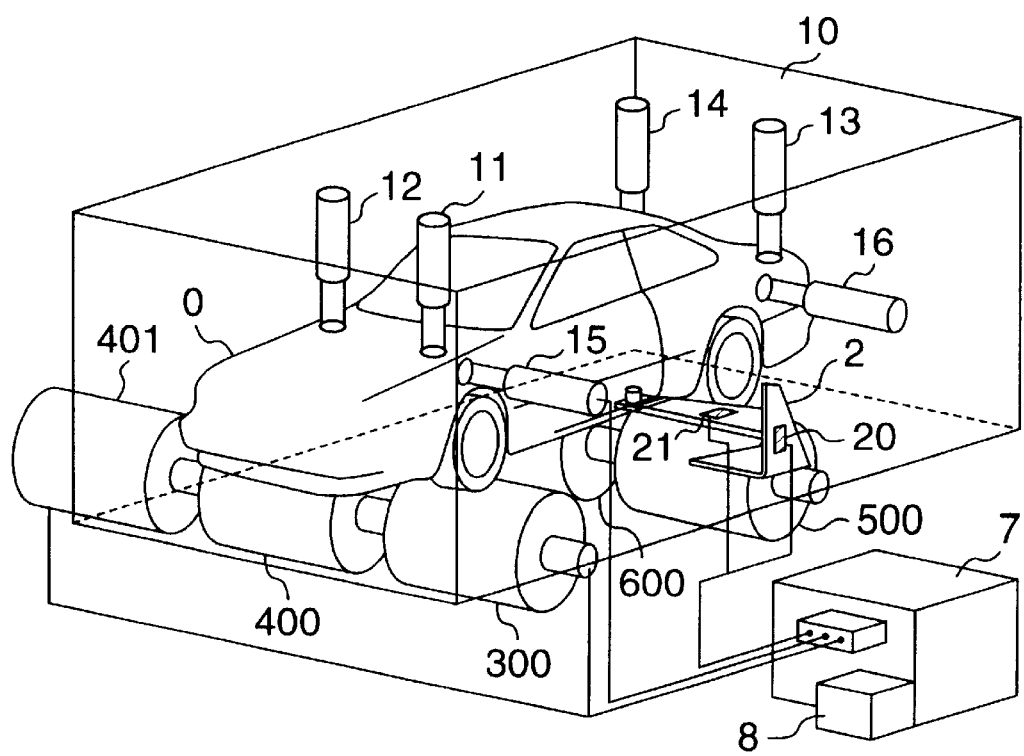
FIG. 12 is a schematic view illustrating an overall arrangement of a third embodiment of the present invention.

Further, as explained in a third embodiment shown in FIG. 12, rollers may be used as the dummy road surface means, instead of the flat belts. This arrangement using the rollers can be constituted by a low cost in comparison with the arrangement using the flat belts, and further, the control of the frictional coefficients of the outer surfaces of the roller can be easily made. However, in the arrangement using the rollers, the positioning of the rollers and the tires is difficult since it is likely that the ground contact conditions of the tires vary soon. In particular, it cannot cope with such a case condition that an angle is set between the roller axial direction and the vehicle crosswise direction (in a yawing occurring condition).

Further, although as shown in FIG. 2, the flat belts or the roller for four wheels are driven, independent from one another, in response to signals from the drive signal storage means 8, the left and right wheels may be linked together, for the sake of brevity, so that each of the pairs of wheels are driven by a single drive motor. In this case, although variations in the left and right drive forces or the like cannot be evaluated, only two motors are required for driving the flat belt or the rollers, and accordingly, the cost of the apparatus can be reduced by a large degree.

Further, such a method that only drive wheels of a vehicle are set on the flat belt or the roller in order to test the maneuverability of the vehicle may be used. Even with this method, a traction characteristic of the vehicle can be evaluated.

Further, although, as shown in FIG. 10, the vehicle is set at a certain yawing angle by means of the actuators 15, 16, the vehicle may be set to a relative yawing angle by moving the flat belts and the rollers with the use of actuators. This method can shorten the setting time in such a case that the actuators cannot be directly attached to the vehicle or that a plurality of vehicles are successively tested in the same test condition.

Figure 13:
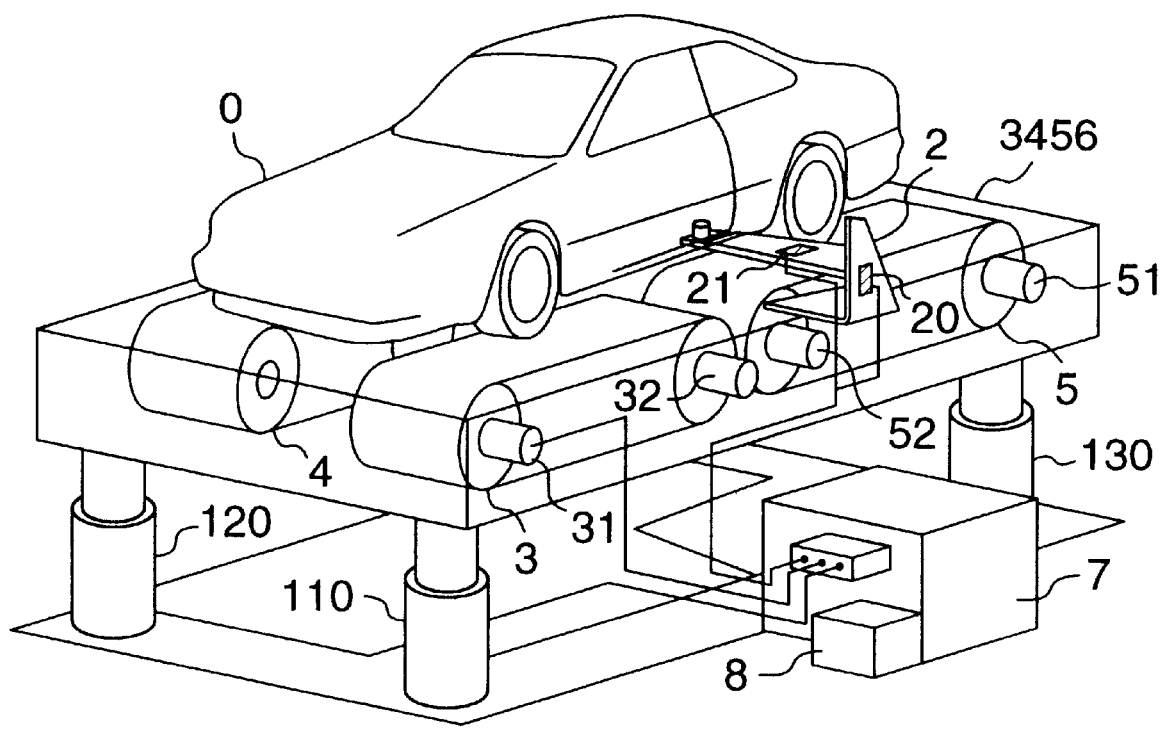
FIG. 13 is a schematic view illustrating an overall arrangement of a forth embodiment of the present invention.
Figure 14:
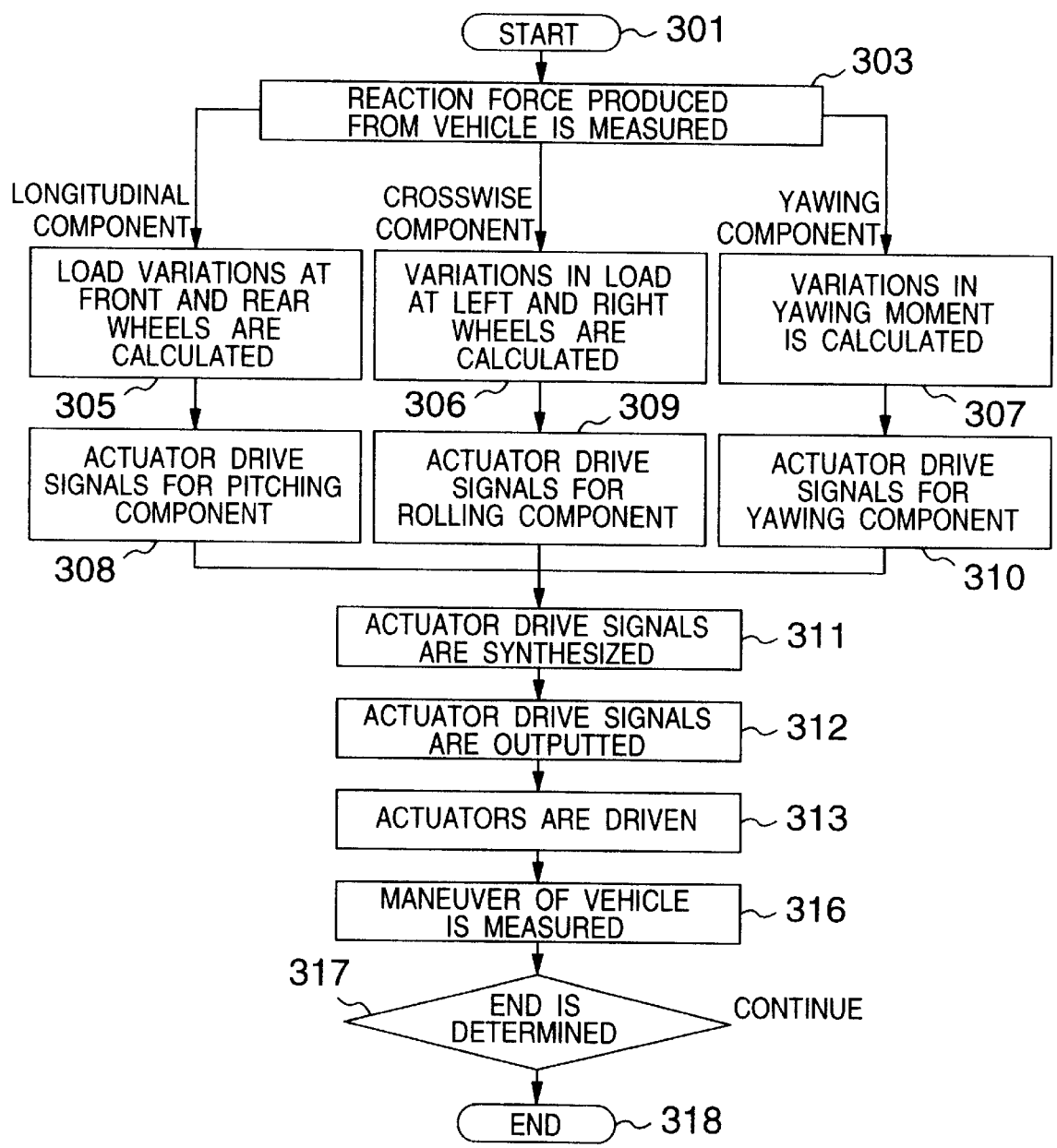
FIG. 14 is a flow chart showing a test procedure of a vehicle maneuver test apparatus in the fourth embodiment of the present invention.

FIG. 13 shows a fourth embodiment of the present invention. According to the present invention, the vehicle O is carried by flat belts 3, 4, 5, 6 (the flat belt 6 is not shown in this figure) which are attached to a base 3456 supported to a floor through the intermediary of actuators 110, 120, 130, 140 (the actuator 140 are not shown in this figure. This arrangement are the same as that explained in any of the first to third embodiment, except that the actuators are not directly attached to the vehicle body or the jig. The actuator 110, 120, 130, 140 are driven in response to drive signals computed by the computing means 7, similar to the first to third embodiments of the present invention, so as to displace the base 3456 to an optional angle relative to the floor.

Next, explanation will be hereinbelow made of a testing method with the use of the vehicle maneuver testing apparatus according to the present invention.
(19) Start (step 301)
(20) A reaction force produced from the vehicle is measured (step 304); (Vehicle Longitudinal Component)
(21) Load variations at the front and rear wheels are calculated (step 305);
(22) Actuator drive signals for a pitching component of the base 3456 are calculated (step 308); (Vehicle Crosswise Component)
(23) Variations in load at the left and right wheels are calculated (step 306);
(24) Actuator drive signals for a rolling component of the base 3456 are calculated (step 309); (Vehicle Yawing Component)
(25) A variation in yawing moment is calculated (step 307);
(26) Actuator drive signals for a yawing component of the base 3456 are calculated (step 310);
(27) The actuator drive signals for the base are synthesized (step 311);
(28) The actuator drive signals for the base 3456 are outputted (step 312);
(29) The actuators for the base 3456 are driven (step 313);
(30) The maneuver of the vehicle is measured (step 316);
(31) An end is determined (step 317); and
(32) End (step 318)

The determination of an end is made by determining whether a predetermined time elapses or not, or whether a rest signal is delivered to the vehicle maneuver testing apparatus or not.

Although the above-mentioned steps are adapted to cope with a vehicle to be tested in a loading condition which is obtained from a flat road surface, there may be such a case that the inclination angle of the base 3456 in a steady-state condition is changed in accordance with road data such as a ramp surface or an climbing slope, a number of occupants, and a loading weight.

Figure 8:
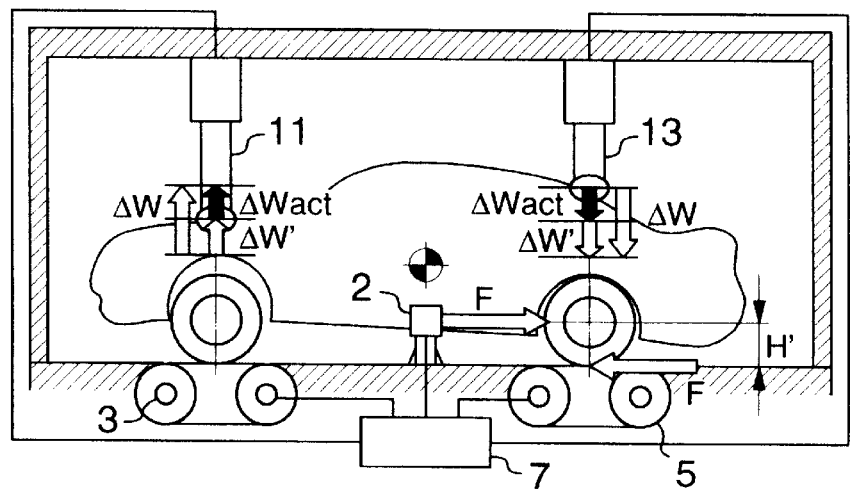
FIG. 8 is a view showing a balance of forces upon acceleration of a vehicle in a condition in which the vehicle maneuver test apparatus in the first embodiment of the present invention is operated.
Figure 15:
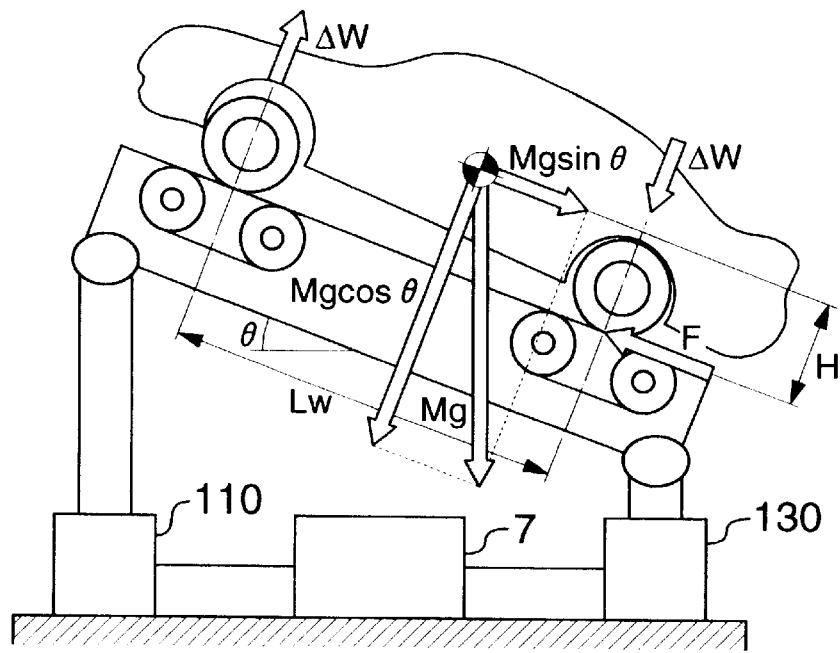
FIG. 15 is a view showing a balance of forces upon acceleration of a vehicle in a condition in which the vehicle maneuver test apparatus in the fourth embodiment of the present invention is operated.

FIG. 15 is a view, similar to FIG. 8, for explaining a technique in the fourth embodiment of the present invention, which can simulate an accelerating condition the same as that during actual running. Estimating here that the base 3456 is turned by an angle θ around the vehicle cross-wise axis (pitching axis), relative to the floor, a gravitational force M*g is exerted to the vehicle, where M is the mass of the vehicle, and g is the gravitational acceleration. This gravitational force can be decomposed into vertical and horizontal components for the base 3456 as follows:

Vertical Component: $Mg \cos\theta$  (Formula 18)

Horizontal Component: $Mg \sin\theta$  (Formula 19)

Further, a load variation ΔW is effected between the front and rear wheels. By setting the distribution of the front and rear weights to 50:50, a load Wfb (for two wheel) at the front wheels is given by the following formula:

$Wfb = (\frac{1}{2})Mg \cos\theta - (H/Lw)Mg \sin\theta$  (Formula 20)

where Lw is the wheel base of the vehicle.

A load Wrb (for wheels) at rear wheels is given by the following formula:

$Wrb = (\frac{1}{2})Mg \cos\theta + (H/Lw)Mg$  (Formula 21)

Meanwhile, considering a vehicle which accelerates at an acceleration α during actual running, the load (for two wheel) at the front wheels is exhibited by the following formula:

$Wfr = (\frac{1}{2})Mg - (H/Lw)M\alpha$  (Formula 22).

The load (for two wheel) at the rear wheels is given the following formula:

$Wrr = (\frac{1}{2})Mg + (H/Lw)M\alpha$  (Formula 23)

Accordingly, in such a case that the evaluation is made by considering that the loads at the rear wheel are important, the acceleration of the vehicle during actual running is estimated from forces exerted to the flat belts, and the angle of the base 3465 with respect to the floor is adjusted so as to obtain an angle θ which is given by the following formula:

$$\theta = F_p(\alpha) = \text{ArcSin}\left[\frac{\left(\frac{1}{2} + \frac{H}{Lw}M\frac{\alpha}{g}\right)}{\sqrt{\left(\frac{1}{2}\right)^2 + \left(\frac{H}{Lw}\right)^2}}\right] - \text{ArcTan}\left[\frac{\frac{1}{2}}{\frac{H}{Lw}}\right]$$  (Formula 24)

In such a case that the test is approximately carried out, the angle of the base 3456 with respect to the floor is adjusted in order to balance the force exerted to the flat belt from the wheel in a rotating direction with the horizontal component of the gravitational force of the base 3456 exhibited by Formula 19. Accordingly, the force exerted to the arresting member 2 can be set to zero. On the contrary, the angle of the base 3456 with respect to the floor is adjusted under control so as to cause the force exerted to the arresting member 2 to approach zero, and therefore, an accelerating condition the same that during actual running can be simulated, similar to FIG. 8. Further, since the necessity of arresting the vehicle can be eliminated by carrying out the above-mentioned control, it is expectable that the test can be carried out between the arresting member 2 and the vehicle O in a condition nearly equal to a condition obtained during actual running.

Figure 16:
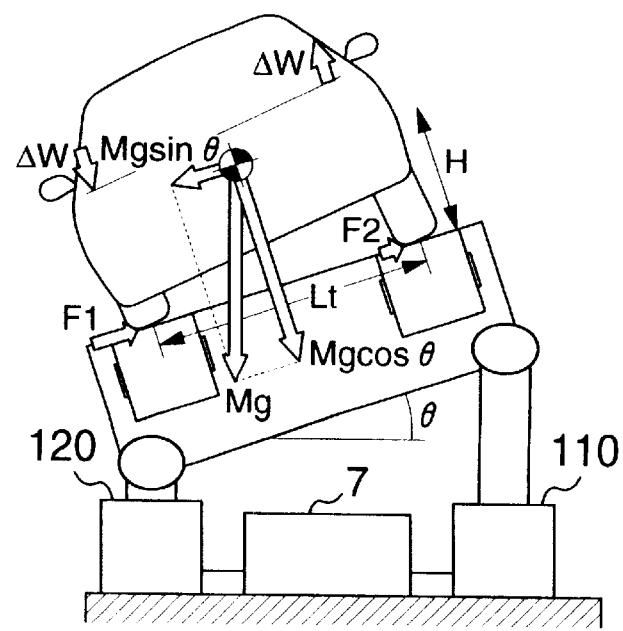
FIG. 16 is a view showing a balance for force upon turning of a vehicle in a condition in which the vehicle maneuver test apparatus in the fourth embodiment is operated.

With reference to FIG. 16, a technique in the fourth embodiment of the present invention, with which a turning condition identical with that during actual running is created (as to a left turn in this figure), will be hereinbelow explained. It is noted that the distribution of the front weight and the rear weight is set to 50:50, and the left and right wheels are considered as front and rear pairs.

Similar to FIG. 15, estimation is made such that the base 3456 is turned about the vehicle longitudinal axis (rolling axis) by an angle θ with respect to the floor. A gravitational force Mg is exerted to the vehicle where M is the mass of the vehicle, and g is the gravitational acceleration. This gravitational force is decomposed into a vertical component and a horizontal component as to the base 3456.

Vertical Component: $Mg \cos\theta$  (Formula 25)

Horizontal Component: $Mg \sin\theta$  (Formula 26)

A load variation ΔW is effected between the left and right wheels. The front and rear treads are equal to each other, and accordingly, a load Wleb (for two wheels) at the left wheels is given by the following formula:

$Wleb = (\frac{1}{2})Mg \cos\theta - (H/Lt)Mg \sin\theta$  (Formula 27)

where Lt is a degree of the front and rear treads. A load (for two wheels) at the right wheels is given by the following formula:

$Wrib = (\frac{1}{2})Mg \cos\theta + (H/Lt)M \sin\theta$  (Formula 28)

Meanwhile, when a vehicle which leftward turns at a centrifugal acceleration β during actual running is considered, a load Wler (for two wheels) at the left wheels is given the following formula:

$Wler = (\frac{1}{2})Mg + (H/Lt)M\alpha$  (Formula 29)

Further, a load Wrir (for two wheels) at the right wheels is given by the following formula:

$Wrir = (\frac{1}{2})Mg - (H/Lt)M\alpha$  (Formula 30)

Accordingly, in such a case that the evaluation is made so as to consider the outside (the right side in the figure) to be important, the centrifugal acceleration β of the vehicle during actual running is estimated from the forces exerted to the flat belts so as to adjust the angle of the base 3456 about the vehicle longitudinal axis with respect to the floor to θ which is given by the following formula:

$$\theta = F_p(\alpha) = \left[\frac{\left(\frac{1}{2} + \frac{H}{Lw}M\frac{\alpha}{g}\right)}{\sqrt{\left(\frac{1}{2}\right)^2 + \left(\frac{H}{Lw}\right)^2}}\right] - \text{ArcTan}\left[\frac{\frac{1}{2}}{\frac{H}{Lw}}\right]$$  (Formula 31)

In such a case that the test is approximately carried out, the angle of the base 3456 with respect to the floor is adjusted in order to balance the force exerted to the flat belt from the wheel with the horizontal component of the gravitational force of the base 3456 exhibited by Formula 29. Accordingly, the force exerted to the arresting member 2 can be set to zero. On the contrary, the angle of the base 3456 with respect to the floor is adjusted under control so as to cause the force exerted to the arresting member 2 to approach zero, and therefore, an accelerating condition the same that during actual running can be simulated, similar to FIG. 9. Further, since the necessity of arresting the vehicle can be eliminated by carrying out the above-mentioned control, it is expectable that the test can be carried out between the arresting member 2 and the vehicle O in a condition more nearly equal to a condition obtained during actual running.

Figure 17:
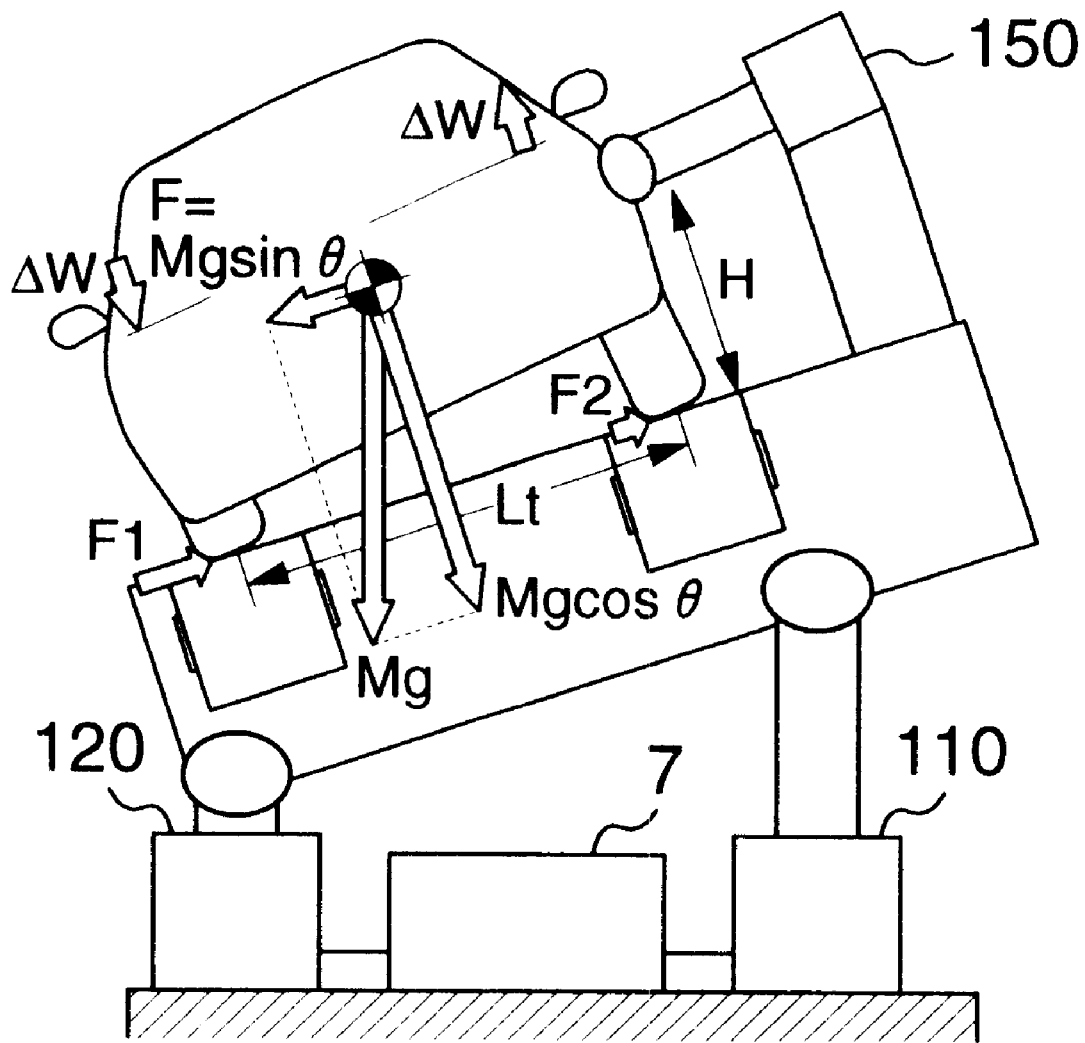
FIG. 17 is a view showing a method of simulating a maneuver having a deviation between a vehicle advancing direction and a direction of a tire upon cornering in the fourth embodiment of the present invention.

FIG. 17 is a view illustrating a fifth embodiment of the present invention, in which crosswise actuators 150, 160 (the actuator 160 is not shown in this figure) are provided to the base 3456.

With this arrangement, such a condition that a deviation exists between the vehicle advancing direction and the tire direction upon cornering, similar to FIG. 10, that is, a condition in which the tire has a slip angle can be simulated.

In this embodiment, a frictional force between the tire and the flat belt, a moment can be detected, and according, the test can be carried out, the positional relationship between the vehicle and the flat belts being set to an optional angle with the use of the actuators 150, 160 while a balance for a yawing moment is held.

Further, even though the frictional force between the tire and the flat belt varies moment by moment due to a load variation or the like, since a yaw moment and a crosswise balance are computed by the computing means 7 so as to deliver drive signals to the actuators in order to balance forces produced by the actuators with centripetal forces caused by cornering forces of the tires, the vehicle is prevented from coming off from the flat belts.

Further, by inclining the base 3456, the horizontal component of the gravitational force as to the base 3456 can be controlled, and accordingly, it is possible to broaden the control range.

As mentioned above, there has been explained in the fourth embodiment of the present invention such a method that pitching, rolling and yawing are produced in accordance with a vehicle driving condition and vehicle dimensions including a wheel base and a tread, and load variation and alignment variation which are similar to those during actual running are forcibly simulated with the use of the actuators in order to carry out a bench test in a condition substantially the same as that during actual running. In this embodiment, although the pitching, the rolling and the yawing are produced, independent from one another, it is natural that they can be produced in combination so as to cope with variation in the maneuvering of the vehicle. In such a case, the computing means 7 computes drive signals for the actuators so that the actuators are coordinately operated.

As mentioned above, in the vehicle maneuver testing apparatus in which a maneuverability of a vehicle is tested on the flat belts or the rollers which face wheels and which are adapted to be rotated together with the wheels, alignment variation of the tires caused by load variation and suspension strokes due to an inertia force and a centrifugal force produced during actual running is forcibly reproduced by actuator forces and a gravitational force in order to evaluate a maneuverability of a vehicle in a condition substantially the same as that during actual running of the vehicle. In this embodiment, although such an example has been explained that the vehicle is arrested in the vicinity of the torque box, such a case that the vehicle is arrested by a wire may also be used. In this case, load cells or the like are arranged among the vehicle, the wires and a frame so as to measure reaction forces of the vehicle in order to reproduce tire alignment variation caused by load variation and suspension strokes due to an inertial force and a centrifugal force which are produced during actual running of the vehicle, with the use of the actuator forces or a gravitational force, thereby it is possible to evaluate a maneuverability of the vehicle in a condition substantially the same as that during actual running actual running of the vehicle. case that load variation and tire alignment variation which are completely the same as that during actual running of a vehicle cannot be simulated due to an arrangement of the actuator, a method of arresting a vehicle or a condition of a vehicle, a maneuverability of a vehicle can be tested, according to the present invention, with a relative high degree of accuracy, in comparison, with a conventional testing method in which a vehicle is simply fixed and is testing on flat belts of rollers. Further, it is not noted that various modifications and changes can be to made to the above-mentioned embodiments without departing the conceptional scope of the present invention.

Further in the vehicle testing apparatus according to the present invention, there is provided a test condition storage means in which test conditions including shapes of road surfaces simulating one side ramps, climbing slops and the like are stored and accordingly, the computer 7 serving as a computing means simulates a force generated from the gravitational acceleration in accordance with a test condition stored in the above-mentioned storage condition, and then the computer 7 computes drive signals for driving the actuators so as to exert the thus simulated force to the vehicle.

Further, in the test condition storage means in the vehicle testing apparatus according to the present invention, there may be stored test conditions relating to loading weights such as occupants, loads and the like, in order to simulate a gravitational force exerted to a vehicle, and accordingly, the actuators may be driven so as to exert the thus simulated gravitational force to a vehicle. With this arrangement, a maneuverability test which is identical with that during actual running of a vehicle can be made. In particular, by storing test conditions relating loading weights such as occupants or loads in the test condition storage means, a maneuverability of a vehicle can be analyzed in such a situation that a ramp, a climbing slope or the like, and a loading condition of the vehicle are reproduced.

According to the above-mentioned embodiments of the present invention, a load variation of a vehicle, and a tire alignment variation caused by suspension strokes can be simulated, a maneuverability test identical with that during actual running of the vehicle can be made. Thus, there can be analyzed a maneuverability of a vehicle, which should involve a traction characteristic, a turning characteristic, a deceleration characteristic etc. of the vehicle, and load variation and tire alignment variation, and in particular, an abrupt maneuver variation.

What is claimed is:

1. A vehicle testing apparatus for analyzing variation in behavior of a vehicle by testing a vehicle having a vehicle body and wheels on a bench incorporating a frame and a dummy road surface element adapted to rotatably support and serving as a dummy road surface, comprising:

actuators provided between the frame and the vehicle body so as to effect a load shift among the wheels of the vehicle;

a force measuring device having a sensor to detect a variation in load produced in the vehicle and to measure a relative force effected between the bench and the vehicle; and a controller to control drive of the actuators in accordance with a force measured by the force measuring device, in order to control a force effected between the vehicle and the bench.

2. The vehicle testing apparatus as claimed in claim 1, wherein said dummy road surface element comprises a plurality of looped belts on which the wheels of the vehicle can be set, respectively, and the actuators drive the dummy road surface element so as to change heightwise positions of the looped belts.

3. The vehicle testing apparatus as claimed in claim 1, wherein a frame is fixed to the bench, and wherein said actuators operate for effecting forces to the vehicle in longitudinal, crosswise, and vertical directions of the vehicle.

4. The vehicle testing apparatus as claimed in claim 1, further comprising a restraint element to restrain motion of the vehicle in a longitudinal direction, wherein the sensor is provided on the restraint element.

5. The vehicle testing apparatus as claimed in claim 4, wherein the restraint element allows crosswise motion, vertical motion, pitching, rolling, and yawing of the vehicle around a position of a gravitational center of the vehicle, while restraining the longitudinal motion of the vehicle.

6. A method of testing a vehicle having a vehicle body and wheels on a bench incorporating a frame and a dummy road surface element adapted rotatably support and serving as a dummy road surface, comprising the steps of:

driving actuators provided between the frame and the vehicle body so as to effect load shift among the wheels of the vehicle;

detecting a variation in load produced in the vehicle for measuring a relative force between the bench and the vehicle; and controlling drive of the actuators in accordance with the measured relative force in order to control a force effected between the bench and the vehicle.

7. A vehicle testing apparatus for analyzing variation in behavior of a vehicle by testing a vehicle a vehicle body and wheels on a bench incorporating a frame and a dummy road surface element adapted to rotatably support and serving as a dummy road surface, comprising:

effecting means provided between the frame and the vehicle body, for effecting a load shift among the wheels of the vehicle;

force measuring means having sensing means for detecting a variation in load produced in the vehicle and for measuring a relative force effected between the bench and the vehicle; and control means for controlling drive of the effecting means in accordance with a force measured by the force measuring means, in order to control a force effected between the vehicle and the bench.

8. The vehicle testing apparatus as claimed in claim 7, wherein said dummy road surface element comprises a plurality of looped belts on which the wheels of the vehicle can be set, respectively, and the effecting means drive the dummy road surface element so as to change heightwise positions of the looped belts.

9. The vehicle testing apparatus as claimed in claim 7, wherein a frame is fixed to the bench, and wherein the effecting means operates for effecting forces to the vehicle in longitudinal, crosswise, and vertical directions of the vehicle.

10. The vehicle testing apparatus as claimed in claim 7, further comprising restraint means for restraining motion in the longitudinal direction, wherein the sensing means is provided on the restraint means.

11. The vehicle testing apparatus as claimed in claim 7, wherein the restraint means allows crosswise motion, vertical motion, pitching, rolling, and yawing of the vehicle around a position of a gravitational center of the vehicle, while restraining the longitudinal motion of the vehicle.

12. A vehicle testing apparatus as claimed in claim 1, wherein said actuators are driven so as to produce a moment about an axis crosswise of the vehicle in accordance with a component which is longitudinal of the vehicle and which is measured by said force measuring means.

13. A vehicle testing apparatus as claimed in claim 1, wherein said actuators are driven so as to produce a moment around an axis crosswise of the vehicle in accordance with a force which is measured by said force measuring means, and which is longitudinal of the vehicle, being exerted to a gravitational center of the vehicle, a height of the gravitational center of the vehicle, and a wheel base of the vehicle.

14. A vehicle testing apparatus as claimed in claim 1, wherein said actuators drive the dummy road surface element so as to apply a force to the vehicle.

15. A method as claimed in claim 6, wherein a force component longitudinal of the vehicle is measured, a moment around an axis crosswise of the vehicle is calculated from the force component, and then said actuators are driven so as to produce the moment.

16. A method as claimed in claim 6, wherein a force which is longitudinal of the vehicle and which is exerted to a gravitational center of the vehicle is measured, a moment around an axis crosswise of the vehicle is calculated from the force, a height of the gravitational center of the vehicle, and a wheel base of the vehicle, and said actuators are driven so as to produce the moment.

17. A method as claimed in claim 6, wherein said actuators drive said dummy road surface element so as to apply a force to the vehicle.

18. A vehicle testing apparatus as claimed in claim 7, wherein a force component longitudinal of the vehicle is measured, a moment around an axis crosswise of the vehicle is calculated from the force component, and then said actuators are driven so as to produce the moment.

19. A vehicle testing apparatus as claimed in claim 7, wherein a force which is longitudinal of the vehicle and which is exerted to a gravitational center of the vehicle is measured, a moment around an axis crosswise of the vehicle is calculated from the force, a height of the gravitational center of the vehicle, and a wheel base of the vehicle, and said actuators are driven so as to produce the moment.

20. A vehicle testing apparatus as claimed in claim 7, wherein said actuators drive said dummy road surface element so as to apply a force to the vehicle.

* * * * *